(12) United States Patent
Vig

(10) Patent No.: US 7,391,867 B2
(45) Date of Patent: Jun. 24, 2008

(54) GRAPHICAL DISPLAY OF QKD SYSTEM STATISTICS

(75) Inventor: Harry Vig, N. Billerica, MA (US)

(73) Assignee: MagiQ Technologies, Inc., New York, NY (US)

( * ) Notice: Subject to any disclaimer, the term of this patent is extended or adjusted under 35 U.S.C. 154(b) by 794 days.

(21) Appl. No.: 10/829,861

(22) Filed: Apr. 22, 2004

(65) Prior Publication Data

US 2005/0238173 A1 Oct. 27, 2005

(51) Int. Cl.
*H04K 1/00* (2006.01)
*H04K 1/04* (2006.01)

(52) U.S. Cl. .................... 380/277; 380/38; 380/256

(58) Field of Classification Search ............... 380/277, 380/256, 38
See application file for complete search history.

(56) References Cited

U.S. PATENT DOCUMENTS 6,529,601 B1 3/2003 Townsend

OTHER PUBLICATIONS http://www.magiqtech.com/products/whatisqip.php, year 2000.*
Quantum data hiding DiVincenzo, D.P.; Leung, D.W.; Terhal, B.M.; Information Theory, IEEE Transactions on vol. 48, Issue 3, Mar. 2002 pp. 580-598.*
Research Directions in Quantum Cryptography Goel, Rajni; Garuba, Moses; Girma, Anteneh; Information Technology, 2007. ITNG '07. Fourth International Conference on Apr. 2-4, 2007 pp. 779-784.*
Quantum Information Security Protocols and Quantum Coding Theory Lu, Xin; Ma, Zhi; Software Engineering, Artificial Intelligence, Networking, and Parallel/Distributed Computing, 2007. SNPD 2007. Eighth ACIS International Conference on vol. 2, Jul. 30, 2007-Aug. 1, 2007 pp. 352-356.*
Bennett et al., "Experimental Quantum Cryptography," Eurocrypt '90, LNCS473, pp. 253-265, 1991.
Wentworth, "RCA color television system requirements for compatible color [TV] systems," RCA Broadcast News, #77 Jan./Feb. 1954.
Robin, "Composite Video Basics," Broadcast Engineering, Jan. 1, 2004.

* cited by examiner

*Primary Examiner*—David Jung
(74) *Attorney, Agent, or Firm*—Opticus IP Law PLLC

(57) ABSTRACT

Systems and methods for graphically displaying statistical information relating to the operation of a quantum key distribution (QKD) system. The method includes exchanging quantum photons between first and second QKD stations for each combination of modulator states, collecting data on the number of quantum photon counts obtained in each of two detectors for each modulator state combination, defining a statistical region for each modulator state combination based on the collected data, and displaying the statistical regions on a graph having indicia indicating ideal locations for the statistical regions. The method also optionally includes adjusting the QKD system based on the graphically displayed information to optimize system performance.

10 Claims, 4 Drawing Sheets

GRAPHICAL DISPLAY OF QKD SYSTEM STATISTICS

FIELD OF THE INVENTION

The present invention relates to quantum cryptography, and in particular relates to systems and methods for efficiently monitoring select operating parameters and statistics associated with the QKD process.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in an unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in publications by C. H. Bennett et al entitled "Experimental Quantum Cryptography" and by C. H. Bennett entitled "Quantum Cryptography Using Any Two Non-Orthogonal States", Phys. Rev. Lett. 68 3121 (1992).

The general process for performing QKD is described in the book by Bouwmeester et al., "The Physics of Quantum Information," Springer-Verlag 2001, in Section 2.3, pages 27-33, and Section 2.6, pages 43-46, which two sections are hereby incorporated by reference as background information.

To ensure secure operation of the QKD system, system statistics such as the error rate need to be monitored to detect attempted eavesdropping and to ensure that the system itself is not generating errors. For example, a change in the error rate could indicate either the presence of an eavesdropper or a drift in the calibration of the system (e.g., the modulator voltage). Further, ensuring secure system operation includes setting up the QKD system to operate properly in the first place so that the ideal or optimum operation regime can be maintained by monitoring changes in system statistics from the ideal or optimum.

FIG. 1 is a plot of the number of photon counts vs. time for two single-photon detectors in a phase-encoding QKD system. The plot includes sections I-IV associated with respective modulator phase values. To set up the QKD system for ideal operation, there are a number (e.g., eight) modulator states that need to be adjusted. However, displaying these different states on the type of plot of FIG. 1 yields little visual information about the actual state of the system and the type or source of errors. In fact, the error rate statistic alone does not indicate the source of errors, and is not particularly sensitive to certain types of eavesdropping.

More generally, the prior art relating to QKD systems emphasizes operation of prototype systems in their ideal states but provides no discussion about how to actually set up a QKD system to run in the ideal state. Further, there is essentially no discussion in the prior art of how to efficiently monitor the unique QKD system statistics to quickly and efficiently diagnose system errors to start up the system up as quickly as possible and keep it running in its ideal state.

Figure 1:
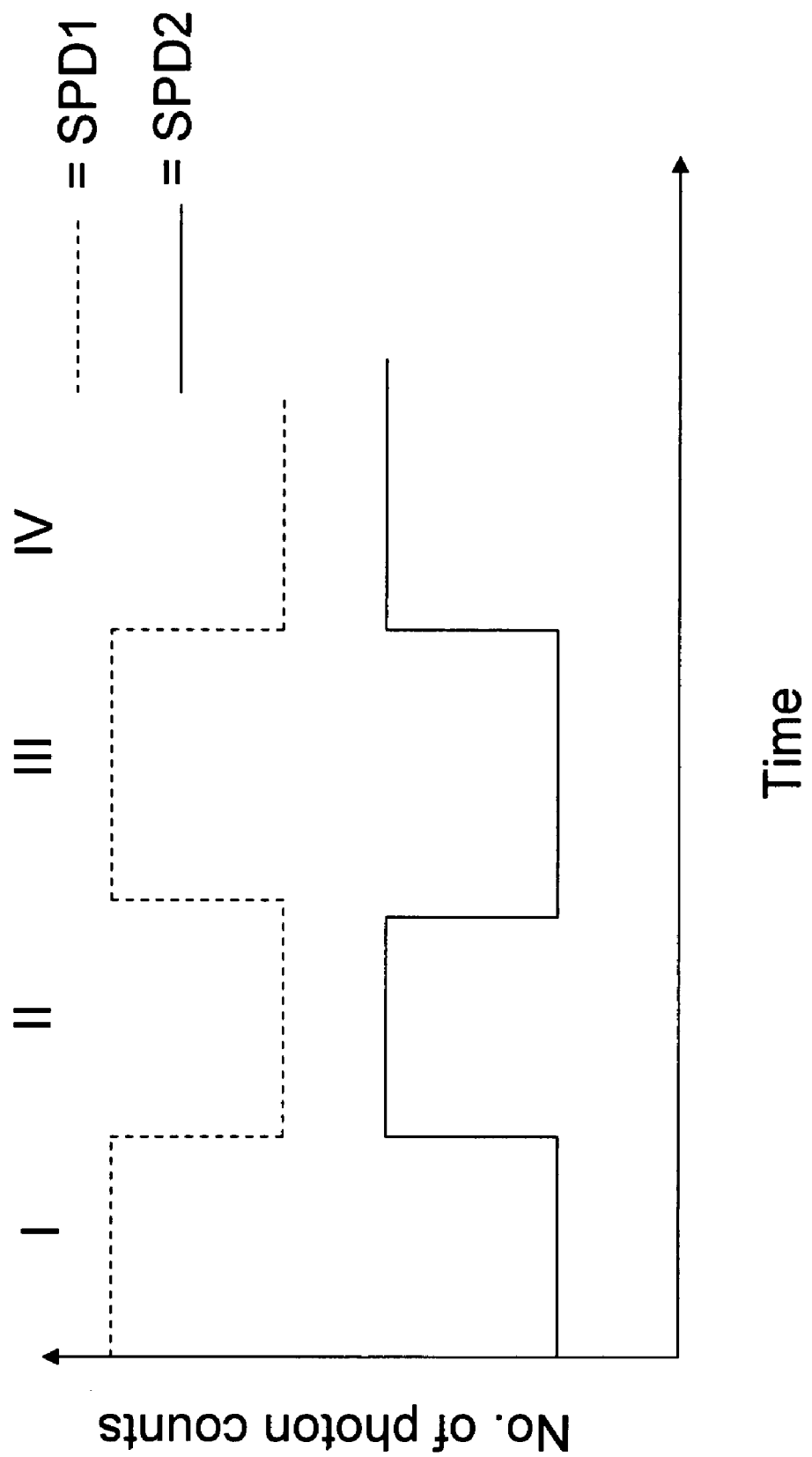
FIG. 1 is an example plot of the number of photon counts vs. time for two single-photon detectors in a phase-encoding QKD system showing different sections I-IV associated with different modulator state combinations.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

SUMMARY OF THE INVENTION

A first aspect of the invention is a method of visually displaying statistical information relating to the operation of a quantum key distribution (QKD) system having first and second single-photon detectors (SPDs) and first and second modulators each having two or more possible modulator states. The method includes exchanging quantum photons between first and second QKD stations for each combination of modulator states. The method also includes collecting data on the number of quantum photon counts obtained in each of the first and second SPDs for each modulator state combination. The method further includes defining a statistical region for each modulator state combination based on said data. The method additionally includes displaying the statistical regions on a graph having indicia indicating ideal locations for the statistical regions.

A second aspect of the invention is a graphical display for displaying statistical information relating to combinations of modulator states and to photon counts in a QKD system. The display includes a semicircular contour representing a number of quantum photon counts, and a plurality of spokes representing overall quantum photon modulation states. The spokes have a common origin at the center of the semicircular contour and are arranged to intersect the contour at a corresponding plurality of locations that represent ideal positions. The display includes statistical regions for each of the modulator state combinations. The statistical regions represent the variation in the photon counts in each detector.

DETAILED DESCRIPTION OF THE INVENTION

Figure 2:
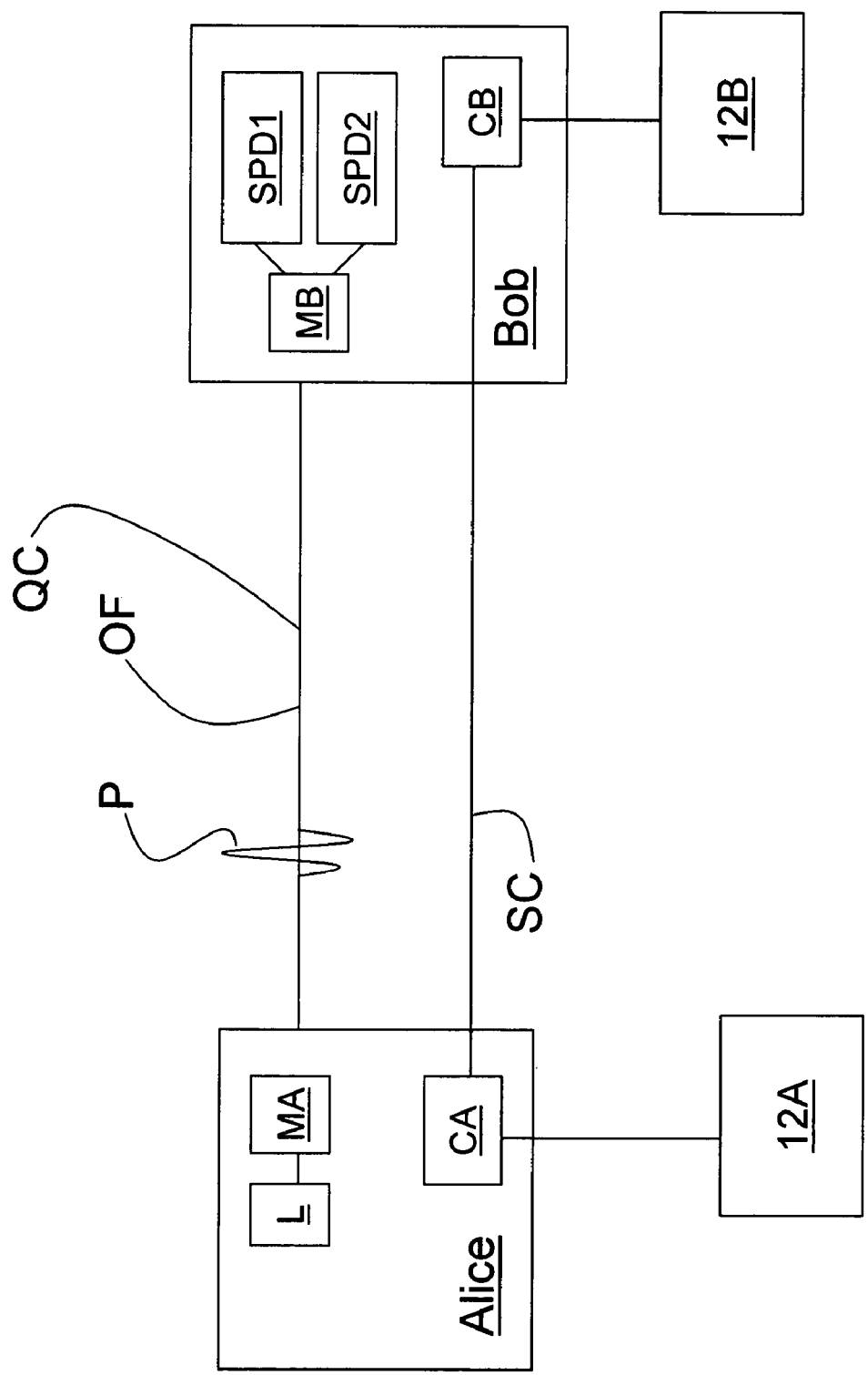
FIG. 2 is a schematic diagram of an example embodiment of a generic QKD system showing the modulators in each of two QKD stations.

FIG. 2 is a schematic diagram of an example embodiment of a generic QKD system that has two QKD stations Alice and Bob, with respective phase modulators MA and MB. Alice also includes a laser L for generating light pulses, and Bob includes two single-photon detectors SPD1 and SPD2 (e.g., avalanche photodiodes) for detecting weak light pulses.

Alice and Bob are connected via an optical fiber OF, which transmits quantum light pulses P from Alice to Bob. A quantum light pulse P is an optical pulse having an average number of photons less than or equal to one. Alice and Bob each have a controller, CA and CB, respectively. Controllers CA and CB are linked via a synchronization (sync) channel SC, which may be sent over the optical fiber OF along with the "quantum channel" QC. Quantum channel QC is the channel by which quantum pulses P are sent over optical fiber OF. Together, controllers CA and CB control the operation of the QKD system, including storing and processing data, such as that associated with the graphical display invention discussed below. Controllers CA and CB also randomly select the modulator states for modulators MA and MB, respectively, from a discrete set of possible modulator states. In an example embodiment, one or both of controllers CA and CB include a programmable computer capable of storing data and performing instructions (e.g. "software") stored on a computer-readable medium (not shown). In an example embodiment, the instructions stored on the computer-readable medium, including the methods according to the present invention as described below.

Coupled to controllers CA and CB are graphical display units 12A and 12B, respectively, for graphically displaying information provided by the controllers and to be viewed by a user (not shown) of the QKD system. Graphical display units may be any one of the known type of display units, such as a CRT or LCD monitor, and may be connected directly to the controller, or be a remote viewing terminal connected by a network to the controller.

The other elements of the QKD system, which are known in the prior art, are not shown in FIG. 1 for the sake of illustration. The timing and calibration of modulators MA and MB, which is critical to establishing and maintaining the operation of a QKD system in its ideal state, are disclosed in U.S. Provisional Patent Application Ser. Nos 60/549,357 and 60/554,687, which Patent Applications are incorporated by reference herein. The information disclosed in the aforesaid Provisional Patent Applications is disclosed in respective U.S. Patent Application Publication Nos. USxxxx/xxxxxxx and US2007/0165862.

In an example embodiment, modulators MA and MB are phase modulators, while in another example embodiment they are polarization modulators. In the example embodiment described below, it is assumed the modulators are phase modulators for the sake of illustration. It is further assumed for the sake of illustration that modulator MA has four modulation states and modulator MB has two modulator states, for a total of eight possible modulator state combinations. In a QKD system, the modulator states for each modulator are randomly selected by a random number generator (not shown) in the respective controllers.

Figure 3:
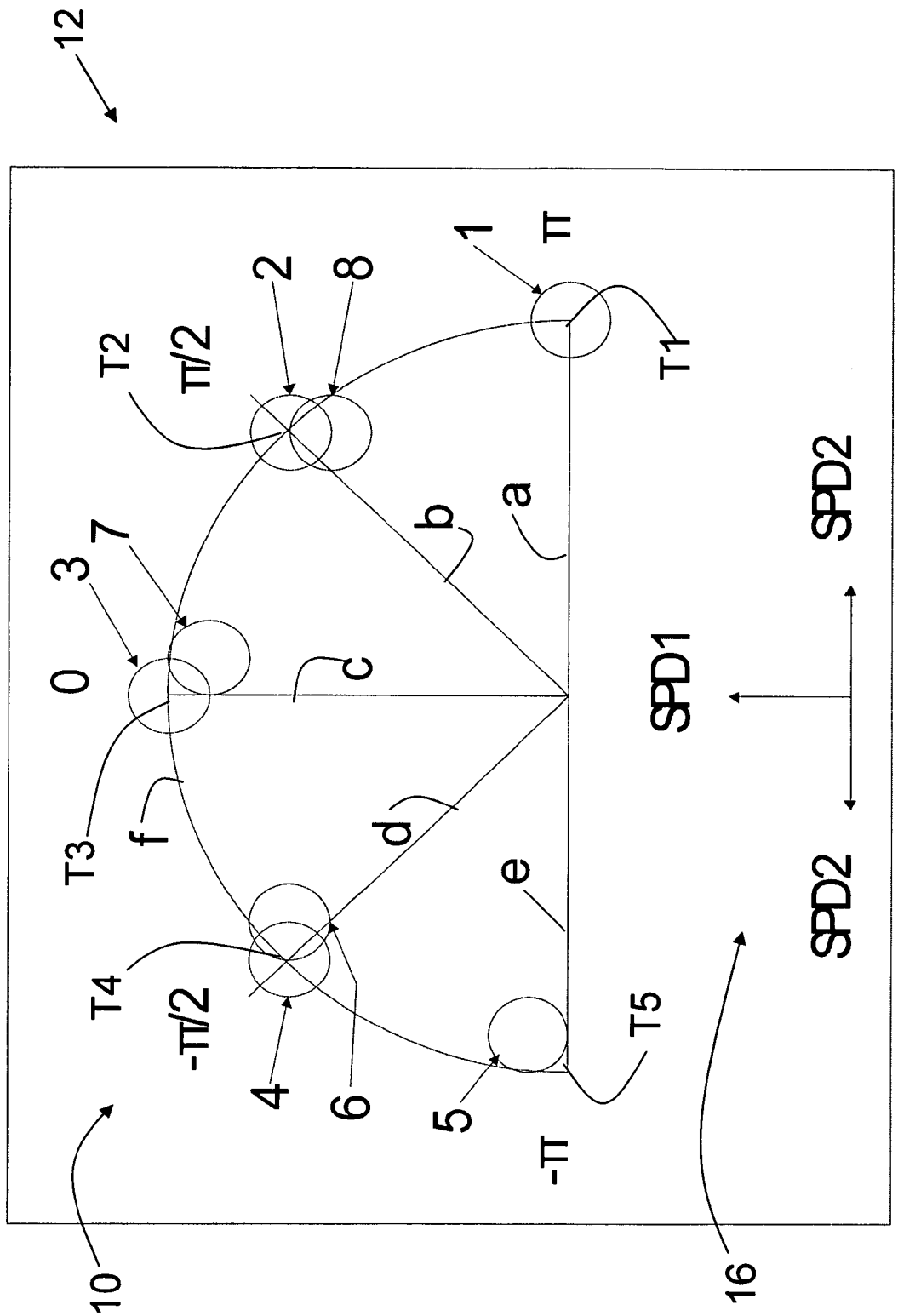
FIG. 3 is a schematic diagram of an example embodiment of the display graph of the present invention used to display statistical information about the eight possible modulator states associated with the QKD system of FIG. 2.

FIG. 3 is a schematic drawing of an example embodiment of a graphical display ("graph") 10 shown on one of the graphical display units 12A or 12B. Graph 10 visually illustrates an operational state of the QKD system of FIG. 1 relating to photon counts and the settings for modulators MA and MB. Graph 10 includes spokes a through e that correspond to the five possible quantum pulse phases (i.e., phase settings $\pi$, $\pi/2$, 0, $-\pi/2$ and $-\pi$) generated by the eight modulator state combinations.

In an example embodiment, graph 10 includes orthogonal x and y axes 16, with the +x and -x directions labeled as SPD2 (single-photon detector 2) and the +y axis labeled as SPD1 (single-photon detector 1). The position (distance) along each axis relative to the origin represents the number of photon counts. Axes 16 (referred to as "SPD axes") are used in graph 10 to provide a quick visual reference as to the number (or relative number) of photon counts being received at each SPD.

For example, if equal numbers of photon counts are received by detectors SPD1 and SPD2, then the total number of counts would lie on a 45 degree line between the SPD1 and SPD2 axes. Thus, in graph 10 the arc f is a contour of constant total detector counts, and the angle over the arc represents the overall quantum photon phase and at which detector the photon counts are occurring.

The intersections of arc f with spokes a through e are indicia or "target points" T1-T5 that represent the ideal graphical location of photon counts for each modulator state setting. Graph 10 also includes regions (e.g., circles or ellipses) 1 through 8, which are statistically calculated to show the distribution of photon counts for each combination of phase modulation states. Statistical regions 5, 6, 7 and 8 are shown offset for the sake of illustration, as they are nominally very close to the ideal locations indicated by target points (indicia) T.

Figure 4:
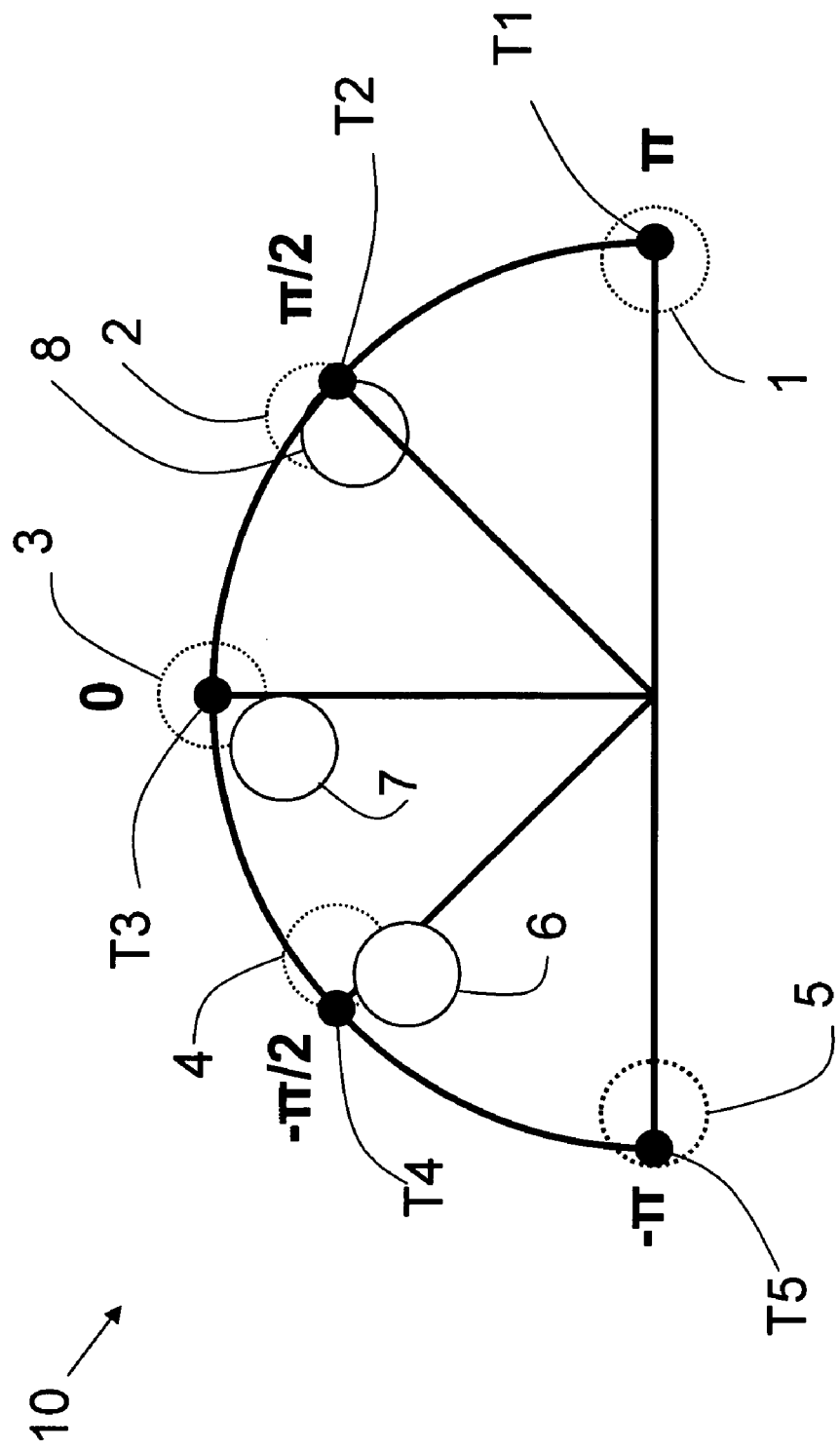
FIG. 4 is a simplified version of the graph shown in FIG. 3.

Note that in the example embodiment of graph 10 of FIGS. 3 and 4 (discussed below), there are five indicia represented as target positions T1-T5 even though there are a total of eight modulator state combinations. This is because the total quantum photon phases of $-\pi/2$, 0 and $-\pi/2$ can be achieved with two possible modulator combinations. In particular, with reference to the table below, target position T2 is associated with regions 2 and 8 for states 2 and 8, target position T3 is associated with regions 3 and 7 for states 3 and 7, and target T4 is associated with regions 4 and 6 for states 4 and 6.

The example embodiment of graph 10 as illustrated in FIG. 3 is used to monitor a QKD system with two phases for Bob's modulator, and four phases for Alice's modulator, for a total of eight modulator state combinations. Other combinations of modulator states are possible for other QKD modulation protocols.

The following process is an example embodiment of a process for generating the data displayed in graph 10 in FIG. 3. With reference also to the QKD system of FIG. 2, for each frame (set) of photons P sent from Alice to Bob, single photon clicks are measured at SPD1 and SPD2 and collected (e.g., in controller CB), along with the modulator state data (i.e., the modulator phase settings) for each click. The data for each combination of modulator states is separated into a corresponding bin (e.g., in a memory register in controller CB). The number of photon clicks for detectors SPD1 and SPD2 is counted for each modulator state combination. The total counts obtained for SPD1 and SPD2 are used for the x and y co-ordinates in graph 10.

The values of some counts are multiplied by -1, as dictated by the following table, to make them roughly fit to graph 10:

| State | Bob's Phase (MB) | Alice's Phase (MA) | Sum Phase | X coord | Y coord |
|---|---|---|---|---|---|
| 1 | $+\pi/4$ | $+3\pi/4$ | $+\pi$ | $\Sigma$Spd2 | $\Sigma$Spd1 |
| 2 | $+\pi/4$ | $+\pi/4$ | $+\pi/2$ | $\Sigma$Spd2 | $\Sigma$Spd1 |
| 3 | $+\pi/4$ | $-\pi/4$ | 0 | $-\Sigma$Spd2 | $\Sigma$Spd1 |
| 4 | $+\pi/4$ | $-3\pi/4$ | $-\pi/2$ | $-\Sigma$Spd2 | $\Sigma$Spd1 |
| 5 | $-\pi/4$ | $-3\pi/4$ | $-\pi$ | $-\Sigma$Spd2 | $\Sigma$Spd1 |
| 6 | $-\pi/4$ | $-\pi/4$ | $-\pi/2$ | $-\Sigma$Spd2 | $\Sigma$Spd1 |
| 7 | $-\pi/4$ | $+\pi/4$ | 0 | $\Sigma$Spd2 | $\Sigma$Spd1 |
| 8 | $-\pi/4$ | $+3\pi/4$ | $+\pi/2$ | $\Sigma$Spd2 | $\Sigma$Spd1 |

Each data point is then plotted on graph 10. The graph can have linear or logarithmic axes to emphasize different parts of the graph. In an example embodiment, graph 10 includes indicia (e.g., markings at the target positions) that show target points of operation and/or that places limits of acceptability for operational data.

A purely linear set of axes will result in a triangle shape for the target values, while a logarithmic set of axes results in the curved shape shown in FIG. 3 Trigonometric transformation functions can make the curve a semicircle by mapping equal count contours onto the desired loci. Logarithmic axes help highlight the display of dark count and extinction ratio data by making the change between two small numbers appear larger on the axes.

When a sufficient number of data points is collected, statistics are calculated (e.g., in controller CA and/or CB) for the data associated with each modulator state combination. In an example embodiment, the statistics relate to the spread (e.g., standard deviation) in the number of photon counts of both photon detectors for a given number of frames (e.g., 30 frames in which 2000 photons may be expected). The statistics may also include the average or mean of the data obtained by each detector for each frame. In an example embodiment, at least 100 photons are exchanged for each modulator state combination.

The statistics are then graphically represented in graph 10 as one or more statistical regions (denoted in FIG. 3 as circles 1 through 8) centered about the average or median value. The data points within the region and the region itself can be optionally turned off (i.e., not displayed in the graph) for ease of viewing the graph, if needed. The size of regions 1-8 along each axis is proportional to the spread of each detector. Thus, a circular statistical region indicates that the spread of each detector is equal to the other. In other example embodiments, the statistical regions are ellipses when the spread in each detector is different.

When initially tuning the QKD system, the actual region locations as well as the change in locations of the regions relative to the ideal target locations (and optionally, ideal target regions) graphically shows the effect of each particular setting of a system parameter (e.g., SPD bias voltage, SPD gate pulse amplitude and width, detector threshold voltages, SPD temperature, ambient temperature, afterpulsing blanking time, modulator voltages, modulator pulse widths, etc.).

Further, by comparing random modulator data to patterned (i.e., non-random) modulator data, system repeatability problems can be highlighted. Thus, in an example embodiment, the QKD system generates and exchanges randomly modulated photons as well as non-randomly modulated photons for each combination of modulator states. Statistical regions associated with the randomly modulated photons and the non-randomly modulated photons are then displayed on graph 10. This allows for the two types of statistical regions to be compared to determine sources of error and to assess the level of security.

The fact that all the data can be viewed in one glance relative to ideal or optimized values (or optimized regions) allows for quick diagnosis of system errors, which in turn allows for reducing the errors quickly and efficiently by adjusting the relevant system parameters.

Due to system variations, the statistical regions 1-8 associated with the different modulator state combinations typically do not all line up identically to their ideal locations (e.g., the target points T1-T5). This is illustrated in FIG. 4, which shows an example embodiment of graph 10 with just the statistical regions 1-8 and target points T1-T5. Statistical regions 6, 7 and 8 are shown as solid circles and regions 1-5 are shown as dotted-line circles. The variance between the solid circles and the target points can be used to calculate a tracked numerical figure of merit for the operating parameters of the apparatus.

Thus, the method of the present invention includes tuning the QKD system operating parameters to position the statistical regions 1-8 as close as possible to their corresponding ideal operating state locations, i.e., target positions T1-T5. Alternatively, the method of the present invention includes positioning the statistical regions 1-8 to suitable operation state positions relative to target positions T1-T5. Adjusting the position of statistical regions 1-8 is accomplished, by varying one or more of the adjustable system parameters from above. As an example, increasing the bias voltage on SPD1 stretches the graph in the vertical axis.

Once the QKD system is suitably tuned, the system statistics can be used to document the error level. This set of statistics can be repeated at regular intervals during operation of the QKD system. Viewing a change in the system statistics via graph 10 allows for a snap-shot view of system performance and can reveal subtle eavesdropping attacks that may be missed by looking at the error rate alone.

Thus, a key advantage of the graphical display method of the present invention is that it makes it easier to observe and diagnose errors in the QKD system, particularly those associated with the process encoding photons with a particular phase or polarization. This is an important and often overlooked aspect of successfully setting up and running a commercially viable QKD system.

A disadvantage of the graphical display method of the present invention is that it cannot be used during key generation without comprising the quantum level of security. This is because the photon counts and modulator state data must be brought together to be analyzed at a single place (e.g., at Alice's controller CA or Bob's controller CB). In example embodiment, this data is encrypted by conventional means and is shared between the controllers. However, it does weaken the security of the quantum bits (qubits) generated during that key exchange process.

However, this limitation can be overcome by discarding the keys under a strict security policy. Under a slightly less stringent security policy, data is taken previous to performing error correction or privacy amplification so that the resulting security weakness introduced by the graphical system monitoring may be acceptable. Data can also be taken on a sampling basis with increased privacy amplification on the tradeoff of longer sampling times, to reduce the density of weakened key bits. The extra visibility of errors may make the compromise palatable, as the extra visibility of errors may make up for the amount of security compromise.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of visually displaying statistical information relating to the operation of a quantum key distribution (QKD) system having first and second single-photon detectors (SPDs) and first and second modulators each having two or more possible modulator states, comprising:

exchanging modulated quantum photons between first and second QKD stations for each combination of modulator states;

in a programmable computer having a computer-readable medium, collecting and storing data on the number of quantum photon counts obtained in each of the first and second SPDs for each modulator state combination;

based on said stored data, defining a statistical region for each modulator state combination based on said data; and displaying, on a graphical display unit, graphical representations of the statistical regions on a graph having indicia indicating ideal locations for the statistical regions.

2. The method of claim 1, including adjusting the QKD system based on the relative locations of the graphical representations of the statistical regions as displayed in the graphical display unit.

3. The method of claim 1, wherein displaying the graphical representations of the statistical regions on the graphical display unit includes:

plotting the statistical regions along axes representing an overall quantum photon modulation and the SPD at which the photon counts were received.

4. The method of claim 1, wherein exchanging quantum photons includes sending at least 100 photons per modulator state combination.

5. The method of claim 1, wherein defining a statistical region includes calculating a standard deviation and a mean for each detector.

6. The method of claim 1, wherein there are eight modulator state combinations corresponding to five overall quantum photon modulations, and further including in the graph five axes arranged as spokes having a common origin and forming a semicircle, wherein the each of the five axes represents an overall quantum photon modulation.

7. The method of claim 6, further including in the graph a semicircular contour representing a number of photon counts, wherein said contour intersects each of the five axes, and where the intersections between the contour and the five axes represent said ideal locations for the statistical regions.

8. The method of claim 1:

wherein exchanging quantum photons includes generating randomly modulated photons and non-randomly modulated photons for each combination of modulator states; and wherein displaying in the graphical representations of the statistical regions on the graphical display unit includes displaying graphical display units of the statistical regions for both the randomly and non-randomly modulated photons.

9. A computer-based system for displaying statistical information relating to combinations of modulator states and to photon counts in a QKD system, comprising:

a graphical display unit;

a controller that includes a programmable computer and a computer-readable medium, the controller being operably coupled to the graphical display unit and configured to provide said statistical information from said computer-readable medium to said graphical display unit so as to form a graphical display thereon, and wherein said graphical display includes:

i) a graphical representation in the form of a semicircular contour representing a number of quantum photon counts;

ii) graphical representations in the form of a plurality of spokes representing overall quantum photon modulation states, the spokes having a common origin at the center of the semicircular contour and arranged to intersect the contour at a corresponding plurality of locations that represent ideal positions; and iii) graphical representations in the form of statistical regions representing the variation in photon counts for each of two single-photon detectors (SPDs) for each modulator state combination.

10. The system of claim 9, wherein there are eight modulator state combinations corresponding to five overall modulator modulations, and five of said spokes.

* * * * *

UNITED STATES PATENT AND TRADEMARK OFFICE
CERTIFICATE OF CORRECTION

Page 1 of 1

PATENT NO. : 7,391,867 B2
APPLICATION NO. : 10/829861
DATED : June 24, 2008
INVENTOR(S) : Harry Vig It is certified that error appears in the above-identified patent and that said Letters Patent is hereby corrected as shown below:

In col. 3, line 28, replace 60/549,357 with -- 60/549,356 --

In col. 3, line 32, replace USxxxx/xxxxxxx with -- US2009/0150561 --

Signed and Sealed this
Sixteenth Day of August, 2011

David J. Kappos
*Director of the United States Patent and Trademark Office*